2,781,719

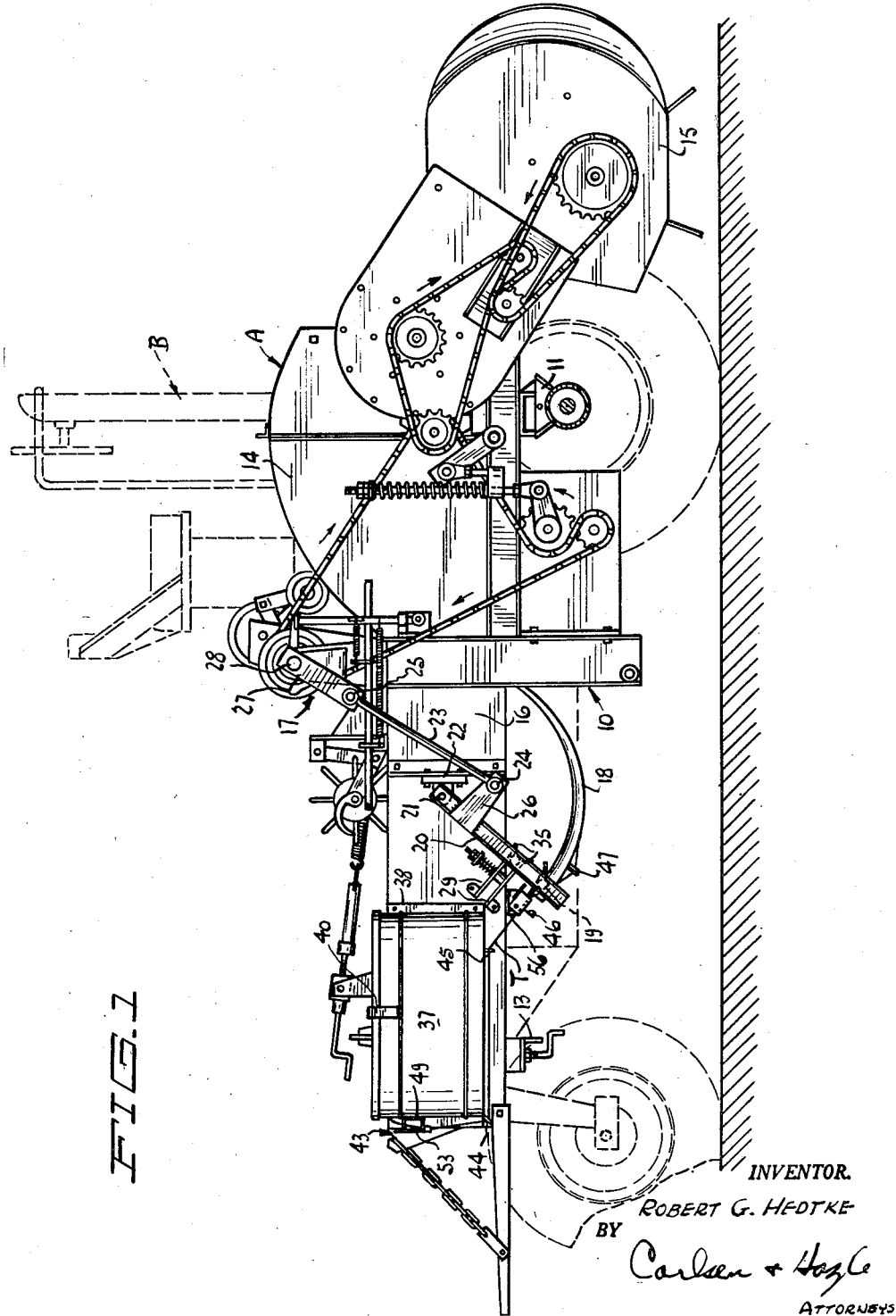

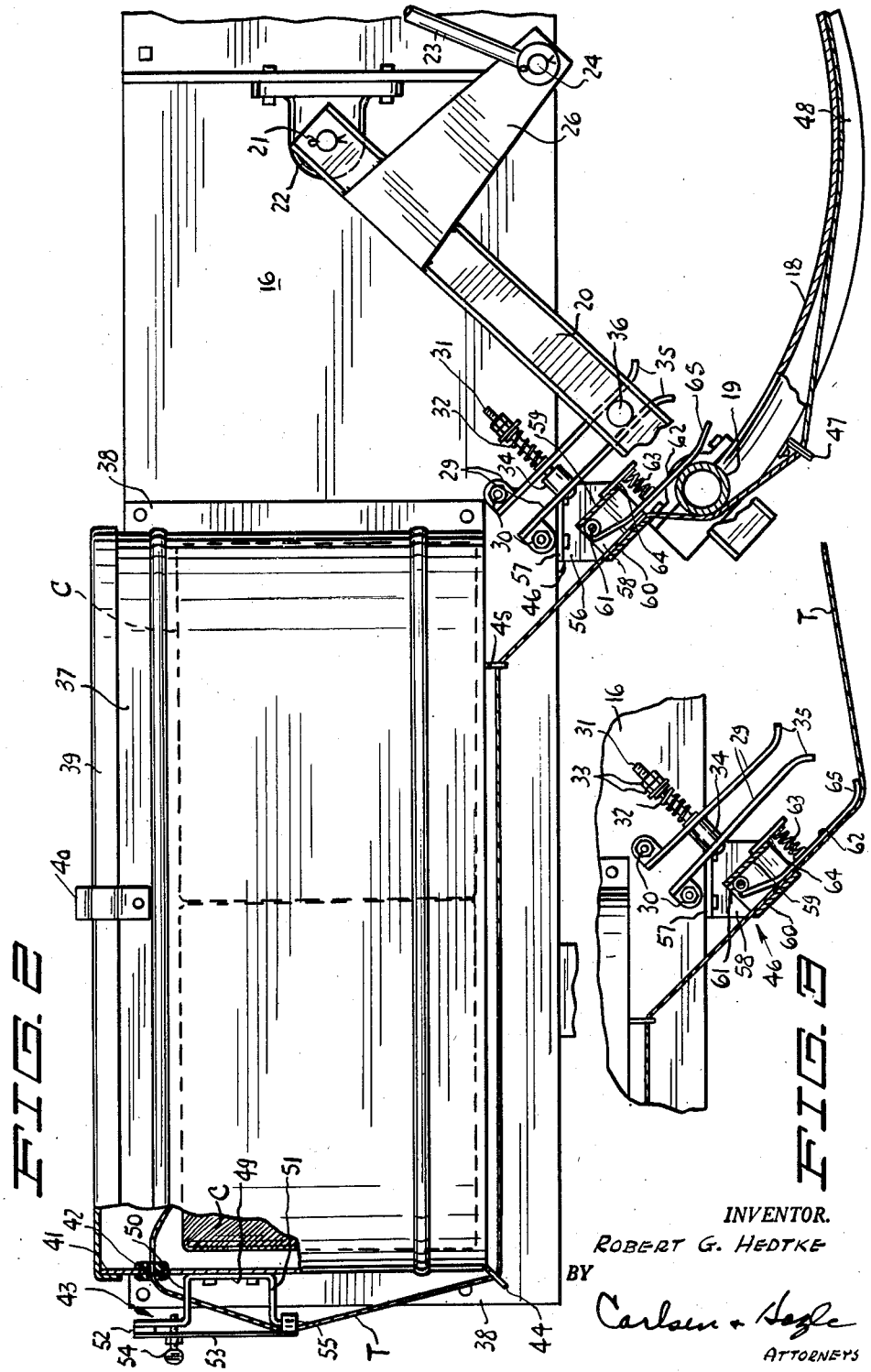

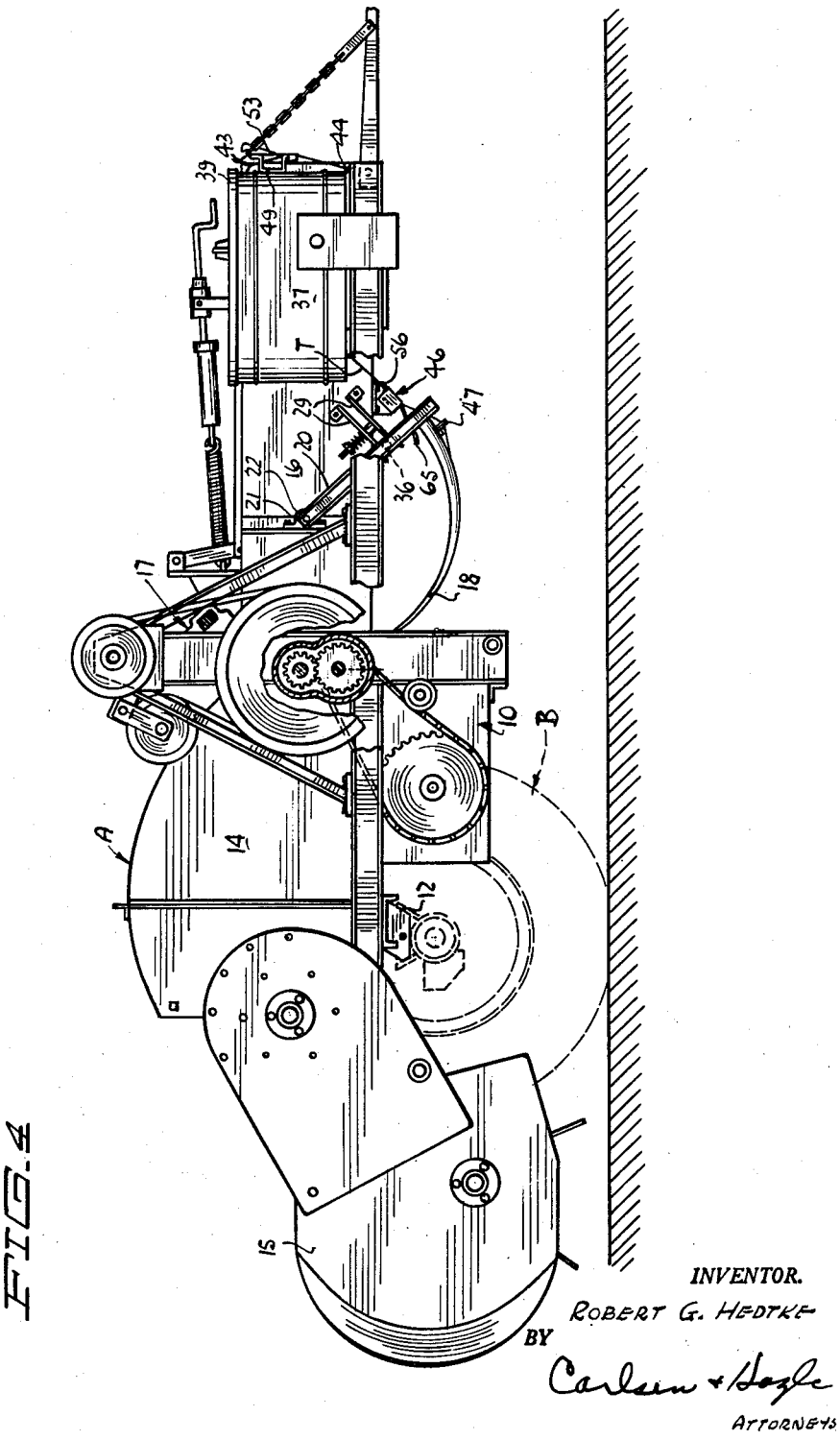

TENSIONING MEANS FOR HAY BALERS

Robert G. Hedtke, Excelsior, Minn., assignor to Minneapolis-Moline Company, Hopkins, Minn., a corporation of Minnesota Application July 9, 1954, Serial No. 442,339

3 Claims. (Cl. 100—19)

This invention relates generally to improvements in machines for baling hay and similar crop materials and tying such bales with twine.

The baling machine here chosen for an explanation of my invention is similar to that disclosed and claimed in the copending application of Benjamin L. Nikkel, Serial No. 430,619, filed May 18, 1954, the baler being of the tractor supported and propelled type, with a straight-through feed, and a baling arrangement for picking up crop from the field, compressing the same in a baling chamber and tying the completed bales with two lengths of twine taken from separate supply balls of the twine carried in twine boxes on opposite sides of the machine. My invention further relates more specifically to certain improvements and refinements over the twine tensioner for such balers as disclosed in the Benjamin L. Nikkel application Serial No. 435,283, filed June 8, 1954.

Much difficulty has been experienced heretofore in the operation of automatic twine tying balers, for the reason that the twine has a pronounced tendency to tangle or to be broken, which tendency is due not only to the fact that twine is pulled in sharp jerks from the balls each time a charge of hay is forced into the baling chamber but by the very nature of the twine itself, which has a tendency to ravel, and thus unevenly resist pulling the twine from the balls. There must, of course, be provided some tension on the twine to yieldably resist the pulling of same from the supply balls into the baling chamber in order to prevent snarling or backlashing and for this purpose I have provided what I refer to herein as a primary tensioning device through which the twine passes from each supply ball and which is adjustable to provide a constant tension at the point, or at least adjacent the point, at which the twine is taken from the supply boxes. It is desirable then that this be the only tension imparted to the twine during the time that the bale is being formed so that as the baling plunger forces successive wads of hay into the baling chamber the sharp, abrupt jerks imparted to the twine will not break the same. When a bale is completed, however, the twine is placed around the end of the bale by swinging needles which deliver the twine at each side into operative relation with the knotters, and this operation requires that longer lengths of twine be drawn from the balls and it is necessary for proper operation to then apply added tension when the needles themselves are pulling twine off the balls, in order to prevent snarling and consequent breakage. For this purpose I provide what I refer to herein as secondary twine tensioning devices through which the twine passes adjacent the needles and which are normally held in ineffective condition by the needles so long as they remain in their normal positions, but are so arranged that as the needles start their movement toward the baling chamber they actuate the secondary twine tensioners to apply added tension to the twine exactly when such additional tension is needed. It is found in practice that this combination of primary and secondary twine tensioners is very effective in that the machine may operate over long periods of time, completely automatically, and without any necessity for halting its operation due to the twine becoming broken or tangled.

Another object of my invention is to provide a twine supply and tensioning system wherein one or more connected supply balls of twine may be arranged side by side in a longitudinally elongated twine box at each side of the machine, with the twine taken from each box through the rear end thereof and directed immediately downward, first through the primary twine tensioner and then forwardly beneath the twine box at each side to a point at which it is directed downward and forward through the secondary twine tensioner and into the needle. A further object is to provide an extremely simple and neat arrangement for these parts which permits their convenient fabrication and servicing as may be required and also to provide means in conjunction with the needles themselves by which they are yieldably held in their normal positions, in which positions they, as aforesaid, function to disable the secondary twine tensioners.

These and other more detailed and specific objects will be disclosed in the course of the following specification, reference being had to the accompanying drawings, in which—

Fig. 1 is a side elevation of a twine tying baler with which my invention is associated, the same being shown as carried upon a special form of tractor which is disclosed only in dotted lines, and the needles being shown in their normal positions.

Fig. 2 is an enlarged side elevation of the rear portion of the machine, with parts thereof in section and particularly illustrating the manner in which the twine is pulled from the twine box through the primary twine tensioner, then forwardly and finally downwardly through the secondary twine tensioner and into the needle.

Fig. 3 is a fragmentary detail view of the secondary twine tensioner showing the same in the condition which it assumes when the needles travel into and through the baling chamber for applying additional tension to the twine.

Fig. 4 is an opposite side view of the baler showing one traction wheel of the tractor in dotted lines and also illustrating the twine supply box, needle, etc., at this side of the machine.

Referring now more particularly and by reference characters to the drawing, the baler, per se, is designated at A and the same is of the type disclosed in the prior copending Nikkel application hereinbefore identified. The construction of the baler will not be described herein other than is necessary to an understanding of my present invention, but it will be noted that the same comprises a frame, designated generally at 10, which frame is carried at three points, designated at 11, 12 and 13, upon a tractor designated generally at B which is the special type fully disclosed in the Martin Ronning Patent No. 2,524,083. The frame 10 includes a feed housing 14 into which hay is delivered by operation of a conventional pick-up 15 located at the front of the baler, through the operation of an oscillatable bale plunger (which is not here shown but which clearly appears in the prior Nikkel application) hay is compressed in wads from the feeder housing into the front of the baling chamber 16 and each time a bale is completed the same is tied with two encompassing lengths of twine by means of a knotter mechanism, designated generally at 17, located atop the upper, forward end of the baling chamber. Twine for this purpose is taken from supply boxes, one of which is located at each rear side of the machine, and the twine is initially carried upwardly through the baling chamber by the upward and forward swinging movement of needles 18, of which there is one at each side of the machine. Such movement of the needles disposes the twine vertically at the front of the baling chamber with the end of the twine held in the knotters and these lengths of twine are left in such position as the needles swing downwardly and rearwardly to their normal position, shown in Figs. 1, 2 and 4. Thus it will be understood that as each wad of hay is forced rearwardly in succession into the baling chamber, twine will be pulled from the supply boxes until, as the bale is completed, it is enclosed across its top, its rear end and its lower side by the twine so that it remains but for the needles 18 to swing upward and forward again to completely encompass the completed bale with the two lengths of twine. As this operation takes place the needles move the twine into the knotters 17 which fasten the twine around the bales, and the return movement of the needles to their normal positions leaves twine stretched vertically across the baling chamber ready for the next bale. It is, of course, obvious that all of these actions are properly synchronized, but since the details of these operations and the structures by which they are performed are immaterial so far as my present invention is concerned, they are not set forth herein.

It will, however, be readily appreciated that as each wad of hay is forced into the baling chamber comparatively short lengths of twine will be pulled from the supply boxes rather abruptly and unless means are provided to prevent it, these successive sharp jerks upon the twine are likely to cause either breakage or snarling of the same which will induce subsequent breakage. This problem is particularly intensified by the very nature of the twine itself which has a tendency to ravel, so that successive coils of the twine in the ball often offer uneven resistance as they are pulled from the ball. Each operation of the needles 18 will also be seen to pull off a longer length of twine from the balls and there must be some provision made for increasing the tension effective on the twine to prevent breakage during these times.

Turning then to consideration of the elements making up my present invention, it will first of all be noted that the needles 18 are carried by a transversely extending yoke 19 which connects their rear ends and is in turn connected to carrier bars 20 located one at each side of the machine. In the normal positions the carrier bars 20 angle upwardly and forwardly alongside the baling chamber 16 and at their forward ends they are pivoted at 21 upon brackets 22 suitably secured to the side of the baler in order to support the needles for swinging movements in vertical, longitudinal planes. The needles 18 are also arcuate in shape and curved on a radius centered at the pivots 21 so that forward swinging movements of the carrier bar 20 will travel the needles from their normal positions upwardly and forwardly into and through the baling chamber as aforesaid. Such movement of the needles 18 is brought about when the time comes by a pitman 23, the opposite ends of which are pivoted at 24 and 25 to an arm 26 extending downwardly and forwardly from the adjacent carrier bar 20 and to a rotary operating lever 27 carried upon the transverse tying shaft 28, as clearly seen in Fig. 1. One complete rotation of the lever 27 will obviously move the needles 18 upwardly through the baling chamber and then back to their normal positions, and since, as will be presently described, the needles in their normal position disable the secondary twine tensioners I have provided means for yieldably holding the needles in such positions against any tendency there might be for them to swing forward due to vibration as the machine travels. Such means comprises at each side of the machine a pair of forwardly and downwardly extending fingers 29, the upper rear ends of which are pivotally attached at 30 to the adjacent side of the baling chamber. A bolt 31 is extended through both of the fingers 29 forwardly of the pivots 30 and is provided with an expansion coil spring 32 adjusted and held in place by lock nuts 33. It is obvious that the spring 32 will tend to close the fingers 29 together, but this movement is limited by the provision of a stop collar 34 between each pair of fingers. It will also be noted that the lower forward ends of the fingers 29 are flared apart at 35 and that each of the carrier arms 20 is provided with a suitably located transversely extending stud 36 which, as the needles return to their normal positions, will be crowded between the fingers 29 spreading them apart slightly and making the spring 32 effective to obtain a frictional grip such as to hold the needles in position. In lieu of the studs 36 for each carrier bar 20 there may, of course, be substituted a cross rod extending between both the carrier arm 20 parallel with the yoke 19.

Twine for supplying each of the needles 18 is carried in the form of one or more interconnected balls, designated at C, which are themselves disposed in a longitudinally elongated twine box 37, one of which is secure to each rear side of the machine. Each twine box is generally rectangular in shape but rounded at its ends and provided with suitable front and rear flanges 38 by which it may be secured to the adjacent side panel of the bale chamber 16. A hinged cover 39 is provided for each twine box, normally held closed by a catch 40, and it will be observed that the balls C of twine are located side by side or one in front of the other. Thus the major dimension of the twine box 37 is horizontally, longitudinally extended so that it blends into the machine with a minimum of vertical or transverse projection. The rear end 41 of each twine box is provided adjacent its upper edge with an apertured grommet 42 through which the twine T is pulled from the ball rearward and then downward through a primary twine tensioner, designated generally at 43. From this point the twine T passes through an eye 44 secured to the lower rear corner of the twine box, then forwardly beneath the box to a second eye 45, from which the twine passes downwardly and forwardly through a secondary twine tensioner, designated generally at 46, from which the twine emerges below the yoke 19 and passes through an apertured guide clip 47 into the hollow downwardly opening channel 48 of the needle. It will, of course, be understood that twine follows the curvature of the needle channel and emerges from the tip thereof into the baling chamber 16.

The primary twine tensioner 43 is secured to the rear end 41 of the twine box and consists of a U-shaped bracket 49 having its ends 50 and 51 turned rearwardly and then bent at right angles into vertical planes, as best shown in Fig. 2. The vertical extremity of the upper end 50 of the bracket has secured to it at 52 a flat leaf spring 53 which extends vertically downward into proximity with the vertical extremity of the lower end 51. An adjustment screw 54 is passed through the upper end portion of the spring 53 and tapped into the bracket so that the spring may be tensioned to bear against the extremity of the lower end 51 of the bracket and the twine T, after emerging from the grommet 42, is brought between the lower end of the spring 53 and adjacent vertical surface of the bracket, as is also clearly shown in Fig. 2. Thus the tension of the spring 53 frictionally resists the withdrawal of the twine from the twine box with the magnitude of this resistance controlled by the adjustment of the screw 54. Any lateral displacement of the twine at the point at which tension is applied is prevented by the provision of ears 55 on the lower ends of the spring 52 or adjacent edges of the bracket as will be readily evident.

The secondary twine tensioner 46 comprises a depending hanger 56 flanged at 57 for fastening to the lower edge of the baling chamber 16. Secured to the hanger 56 is a channel-shaped bracket 58 having upper and lower flanges 59 and 60 which angle downwardly and forwardly and over the lower one of which the twine T passes from the eye 45 and below the yoke 19. Pivoted then upon the bracket 58 at the point 61 is an elongated lever 62 which extends downwardly and forwardly and is biased toward the flange 60 by an expansion coil spring 63 braced between the lever and a clip 64 secured to and extending beyond the upper flange 59. In the normal position of the needles 18 the yoke 19 extends beneath the lever 62, as clearly shown in Fig. 2, and, overcoming the spring 63, holds said lever in spaced relation to the twine T where it passes over the flange 60. But as seen in Fig. 3, as the needles move on their working stroke into and back out of the baling chamber, the yoke 19 clears the lever 62, whereupon the spring 63 forces the lever against the twine and exerts added frictional resistance to travel of the twine into the baling chamber. The lower forward end of the lever 62 is curved upwardly and forwardly, as indicated at 65, not only to insure that the yoke 19 will cam its way beneath the lever as the needles return to their normal positions, but also to guide the twine T in the direction of the baling chamber, as seen in Fig. 3.

It will thus be understood that I have provided a tensioning device 43 by which continuous primary tension will be provided upon the twine, along with means whereby the amount of this tension so provided may be readily adjusted. In addition I have provided a secondary means for applying an added tension to the twine whenever the needles 18 are in other than their normal positions. I find that it is possible to adjust the primary twine tensioner 43 to compensate for the relatively short but quite abrupt jerks by which the twine is pulled from the balls by each successive wad of hay thrust into the baling chamber. The necessary augmented tension may then be supplied only as required at the time the needles are pulling off longer lengths of the twine during their working strokes and this combination has proven to be very satisfactory in extensive use of balers so equipped.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a baler which includes a baling chamber, means for tying bales formed in the chamber with encompassing strands of twine taken from separate supply balls thereof at opposite sides of the baling chamber, and needles swingably mounted forwardly of the supply balls to dispose the twine around the bales and said needles being movable from rearward normal positions forwardly and then rearwardly back to said normal positions; the improvement which comprises a twine box secured to each side of the baling chamber at the rear thereof and longitudinally elongated to hold a plurality of twine balls side by side and one ahead of the other, a transverse yoke connecting the needles below and forwardly of the twine boxes, said twine boxes having openings at their upper rear portions out through which the twine passes from the balls, primary, adjustable twine tensioners located below said openings and operative to yieldably resist the pulling of twine from the balls, the twine passing downwardly from said primary twine tensioners and then forwardly beneath the twine boxes toward said needles, eyes on the twine boxes guiding the twine downwardly and then forwardly, secondary twine tensioners located on the baling chamber below the lower forward corners of the twine boxes and having surfaces angling downwardly and forwardly over which the twine passes toward the needles, and levers pivoted on the secondary twine tensioners and spring biased to bear frictionally downward on the twine passing over said surfaces, and the said levers extending downwardly and forwardly over the said yoke and being normally cammed upward clear of the twine by said yoke when the needles are in their normal positions.

2. For a baler which includes a baling chamber, means for tying bales in the chamber with encompassing strands of twine taken from separate supply balls thereof at opposite sides of the baling chamber, needles swingably mounted forwardly of the supply balls to dispose the twine around the bales, and said needles being movable from rear normal positions forwardly and then rearwardly back to said normal positions; the improvement which comprises a twine box secured to each side of the baling chamber at the rear thereof and longitudinally and horizontally elongated to hold a plurality of twine balls side by side and one ahead of the other, said twine boxes having openings at their upper portions out through which the twine passes from the balls, primary, adjustable twine tensioners located on the twine boxes below said openings and operative to yieldably resist the pulling of twine from the balls, the twine passing downwardly from said primary twine tensioners and then forwardly toward said needles, secondary twine tensioners located on the baling chamber above the rear ends of the needles when the needles are in normal position and having surfaces angling downwardly and forwardly over which the twine passes toward the needles, levers pivoted on the secondary twine tensioners and spring biased to bear frictionally on the twine passing over said surfaces, the said levers extending downwardly and forwardly and being curved upward and forward for guiding the twine as the needles move into the baling chamber, and means on the needles for camming the levers upward clear of the twine when the needles are in their normal positions.

3. For a baler which includes a baling chamber, means for tying bales in the chamber with encompassing strands of twine taken from separate supply balls thereof at opposite sides of the baling chamber, and needles swingably mounted forwardly of the supply balls to dispose the twine around the bales and said needles being movable from rear normal positions forwardly and then rearwardly back to said normal positions; the improvement which comprises a twine box secured to each side of the baling chamber at the rear thereof and longitudinally elongated to hold a plurality of twine balls side by side and one ahead of the other, a transverse yoke connecting the needles below and forwardly of the twine boxes, said twine boxes having openings at their upper rear portions out through which the twine passes from the balls, primary, adjustable twine tensioners located below said openings and operative to yieldably resist the pulling of twine from the balls, the twine passing downwardly from said primary twine tensioners and then forwardly beneath the twine boxes toward said needles, hanger brackets secured to the baling chamber and depending therefrom, secondary twine tensioners secured to said hanger brackets below the lower forward corners of the twine boxes and having surfaces angling downwardly and forwardly over which the twine passes to the needles, and levers pivoted on the secondary twine tensioners and spring biased to bear frictionally on the twine passing over said surfaces, and the said levers extending downwardly and forwardly over the said yoke and being normally cammed clear of the twine by said yoke when the needles are in their normal positions.

References Cited in the file of this patent
UNITED STATES PATENTS

| | | |
|---|---|---|
| 1,213,993 | Zachow | Jan. 30, 1917 |
| 2,363,391 | Bunn | Nov. 21, 1944 |
| 2,374,900 | Saxton | May 1, 1945 |
| 2,403,396 | Raney | July 2, 1946 |
| 2,512,754 | Tuft | June 27, 1950 |
| 2,585,425 | Baskerville | Feb. 12, 1952 |